United States Patent
Spangler et al.

(10) Patent No.: US 10,619,489 B2
(45) Date of Patent: Apr. 14, 2020

(54) AIRFOIL HAVING END WALL CONTOURED PEDESTALS

(71) Applicant: United Technologies Corporation, Farmington, CT (US)

(72) Inventors: Brandon W. Spangler, Vernon, CT (US); Atul Kohli, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 183 days.

(21) Appl. No.: 15/696,259

(22) Filed: Sep. 6, 2017

(65) Prior Publication Data
US 2019/0071980 A1    Mar. 7, 2019

(51) Int. Cl.
*F01D 5/18* (2006.01)
*F01D 9/04* (2006.01)

(52) U.S. Cl.
CPC .............. *F01D 5/187* (2013.01); *F01D 9/041* (2013.01); *F05D 2230/21* (2013.01); *F05D 2240/122* (2013.01); *F05D 2240/304* (2013.01); *F05D 2250/185* (2013.01); *F05D 2260/22141* (2013.01)

(58) Field of Classification Search
CPC ...... F01D 9/041; F01D 5/187; F05D 2230/21; F05D 2240/122; F05D 2240/304; F05D 2250/185; F05D 2260/22141
USPC ....................................................... 415/115
See application file for complete search history.

(56) References Cited

U.S. PATENT DOCUMENTS

| | | | | | |
|---|---|---|---|---|---|
| 3,420,502 A | * | 1/1969 | Howald | ................... | F01D 5/187 415/115 |
| 4,303,374 A | * | 12/1981 | Braddy | ................... | F01D 5/186 415/115 |
| 4,653,983 A | * | 3/1987 | Vehr | ........................ | B23H 9/10 415/115 |
| 5,246,341 A | * | 9/1993 | Hall | ........................ | F01D 5/187 416/97 R |
| 5,337,805 A | * | 8/1994 | Green | ..................... | F01D 5/187 164/122.1 |
| 5,368,441 A | * | 11/1994 | Sylvestro | ................ | F01D 5/187 416/90 A |

(Continued)

FOREIGN PATENT DOCUMENTS

EP        2489838 A2    8/2012

OTHER PUBLICATIONS

European Search Report for European Application No. 18182057.2, International Filing Date Jul. 5, 2018, dated Apr. 1, 2019, 10 pages.

*Primary Examiner* — Hung Q Nguyen
*Assistant Examiner* — Susan E Scharpf
(74) *Attorney, Agent, or Firm* — Cantor Colburn LLP

(57) ABSTRACT

Airfoils and gas turbine engines having the same, the airfoils including an airfoil body having a leading edge and a trailing edge extending in a radial direction, a cooling cavity defined within the airfoil body, wherein at least one wall of the cooling cavity is a curved end wall, and an end wall contoured pedestal positioned adjacent the curved end wall. The end wall contoured pedestal has a first portion with a contoured side wall and a parallel side wall, and a second portion with tapering side walls, wherein the contoured side wall faces the curved end wall, the contoured side wall paralleling a contour of the curved end wall and defining a meter section therebetween.

12 Claims, 7 Drawing Sheets

(56) References Cited

U.S. PATENT DOCUMENTS

| | | | | |
|---|---|---|---|---|
| 5,403,156 | A * | 4/1995 | Arness | F01D 5/081 29/889.21 |
| 5,503,529 | A * | 4/1996 | Anselmi | F01D 5/186 416/90 R |
| 5,669,759 | A * | 9/1997 | Beabout | F01D 5/187 416/97 R |
| 5,772,397 | A * | 6/1998 | Morris | F01D 5/187 415/115 |
| 5,813,835 | A | 9/1998 | Corsmeier et al. | |
| 6,402,470 | B1 * | 6/2002 | Kvasnak | F01D 5/187 415/115 |
| 6,616,406 | B2 * | 9/2003 | Liang | F01D 5/186 416/97 R |
| 6,969,230 | B2 * | 11/2005 | Shi | F01D 5/187 415/115 |
| 7,255,534 | B2 * | 8/2007 | Liang | F01D 5/14 415/115 |
| 7,438,527 | B2 * | 10/2008 | Albert | B22C 9/04 416/97 R |
| 7,780,414 | B1 * | 8/2010 | Liang | B22C 9/10 164/369 |
| 7,806,659 | B1 * | 10/2010 | Liang | F01D 5/187 415/115 |
| 8,016,564 | B1 * | 9/2011 | Liang | F01D 5/186 415/115 |
| 8,807,945 | B2 * | 8/2014 | Spangler | F01D 5/187 416/97 R |
| 8,864,468 | B1 | 10/2014 | Liang | |
| 8,864,469 | B1 | 10/2014 | Liang | |
| 9,017,026 | B2 * | 4/2015 | Bergholz, Jr. | F01D 5/186 416/97 R |
| 9,145,773 | B2 * | 9/2015 | Bergholz, Jr. | F01D 5/187 |
| 9,175,569 | B2 * | 11/2015 | Bergholz, Jr. | F01D 5/18 |
| 9,328,617 | B2 * | 5/2016 | Gautschi | F01D 5/187 |
| 9,482,101 | B2 * | 11/2016 | Xu | F01D 5/186 |
| 2010/0074763 | A1 * | 3/2010 | Liang | F01D 5/187 416/97 R |
| 2014/0147287 | A1 * | 5/2014 | Xu | F01D 5/186 416/96 R |

* cited by examiner

AIRFOIL HAVING END WALL CONTOURED PEDESTALS

STATEMENT REGARDING FEDERALLY SPONSORED RESEARCH OR DEVELOPMENT

This invention was made with government support under Contract No. FA8626-16-C-2139 awarded by the U.S. Air Force. The government has certain rights in the invention.

BACKGROUND

The subject matter disclosed herein generally relates to airflow in components of gas turbine engines and, more particularly, to pedestals in a trailing edge cavity of an airfoil in components of gas turbine engines.

Airfoils, and particularly airfoils of gas turbine engines, may include internal flow passages to enable cooling of the airfoils. The supply of the cooling air through cavities of the airfoils may be carefully designed so as to provide an efficient cooling configuration. However, various structures and/or features of the airfoils may impact cooling schemes, thus reducing the efficiency and/or effectiveness of a cooling scheme.

SUMMARY

According to one embodiment, airfoils for gas turbine engines are provided. The airfoils include an airfoil body having a leading edge and a trailing edge extending in a radial direction, a cooling cavity defined within the airfoil body, wherein at least one wall of the cooling cavity is a curved end wall, and an end wall contoured pedestal positioned adjacent the curved end wall. The end wall contoured pedestal has a first portion with a contoured side wall and a parallel side wall, and a second portion with tapering side walls, wherein the contoured side wall faces the curved end wall, the contoured side wall paralleling a contour of the curved end wall and defining a meter section therebetween.

In addition to one or more of the features described above, or as an alternative, further embodiments of the airfoils may include that an end slot is defined between the contoured side wall and a portion of the curved end wall In addition to one or more of the features described above, or as an alternative, further embodiments of the airfoils may include a plurality of pedestals arranged within the cooling cavity, wherein each pedestal includes a first portion and a second portion, the first portion having parallel side walls and the second having tapering side walls.

In addition to one or more of the features described above, or as an alternative, further embodiments of the airfoils may include that the plurality of pedestals are trailing edge pedestals located at the trailing edge of the airfoil body.

In addition to one or more of the features described above, or as an alternative, further embodiments of the airfoils may include that the airfoil body has an inner diameter and an outer diameter and the curved end wall is located at at least one of the outer diameter and the inner diameter.

In addition to one or more of the features described above, or as an alternative, further embodiments of the airfoils may include that the cooling cavity is a serpentine cavity within the airfoil body.

In addition to one or more of the features described above, or as an alternative, further embodiments of the airfoils may include that the end wall contoured pedestal has a length longer than one and a half times a hydraulic diameter.

In addition to one or more of the features described above, or as an alternative, further embodiments of the airfoils may include that the contoured side wall and the curved end wall have the same shape.

According to some embodiments, gas turbine engines are provided. The gas turbine engines include an airfoil having an airfoil body having a leading edge and a trailing edge extending in a radial direction, a cooling cavity defined within the airfoil body, wherein at least one wall of the cooling cavity is a curved end wall, and an end wall contoured pedestal positioned adjacent the curved end wall. The end wall contoured pedestal has a first portion with a contoured side wall and a parallel side wall, and a second portion with tapering side walls, wherein the contoured side wall faces the curved end wall, the contoured side wall paralleling a contour of the curved end wall and defining a meter section therebetween.

In addition to one or more of the features described above, or as an alternative, further embodiments of the gas turbine engines may include a plurality of pedestals arranged within the cooling cavity, wherein each pedestal includes a first portion and a second portion, the first portion having parallel side walls and the second having tapering side walls.

In addition to one or more of the features described above, or as an alternative, further embodiments of the gas turbine engines may include that the airfoil body has an inner diameter and an outer diameter and the curved end wall is located at at least one of the outer diameter and the inner diameter.

In addition to one or more of the features described above, or as an alternative, further embodiments of the gas turbine engines may include that the cooling cavity is a serpentine cavity within the airfoil body.

In addition to one or more of the features described above, or as an alternative, further embodiments of the gas turbine engines may include that the end wall contoured pedestal has a length longer than one and a half times a hydraulic diameter.

In addition to one or more of the features described above, or as an alternative, further embodiments of the gas turbine engines may include that the contoured side wall and the curved end wall have the same shape.

According to some embodiments, cores for manufacturing airfoils of gas turbine engines are provided. The cores include a core body having a plurality of apertures and voids therein configured to enable manufacture of the airfoil, the core body having a leading edge and a trailing edge extending in a radial direction, wherein the core body includes structures to define a cooling cavity and at least one wall of the cooling cavity, wherein the at least one wall is a curved end wall and an end wall contoured pedestal void positioned adjacent the structure defining the curved end wall. The end wall contoured pedestal void has a first portion with a contoured side wall and a parallel side wall, and a second portion with tapering side walls, wherein the contoured side wall faces the curved end wall, the contoured side wall paralleling a contour of the curved end wall and defining a meter section therebetween.

In addition to one or more of the features described above, or as an alternative, further embodiments of the gas turbine engines may include that an end slot structure is defined between the contoured side wall and a portion of the curved end wall structure such that a meter section is formed along a length of the contoured side wall.

In addition to one or more of the features described above, or as an alternative, further embodiments of the gas turbine engines may include a plurality of pedestal voids arranged within the cooling cavity structure, wherein each pedestal void includes a first portion and a second portion, the first portion having parallel side walls and the second having tapering side walls;

In addition to one or more of the features described above, or as an alternative, further embodiments of the gas turbine engines may include that the core body has an inner diameter and an outer diameter and the curved end wall structure is located at the outer diameter.

In addition to one or more of the features described above, or as an alternative, further embodiments of the gas turbine engines may include that the core body defines a serpentine cavity structure.

In addition to one or more of the features described above, or as an alternative, further embodiments of the gas turbine engines may include that the end wall contoured pedestal has a length longer than one and a half times a hydraulic diameter.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
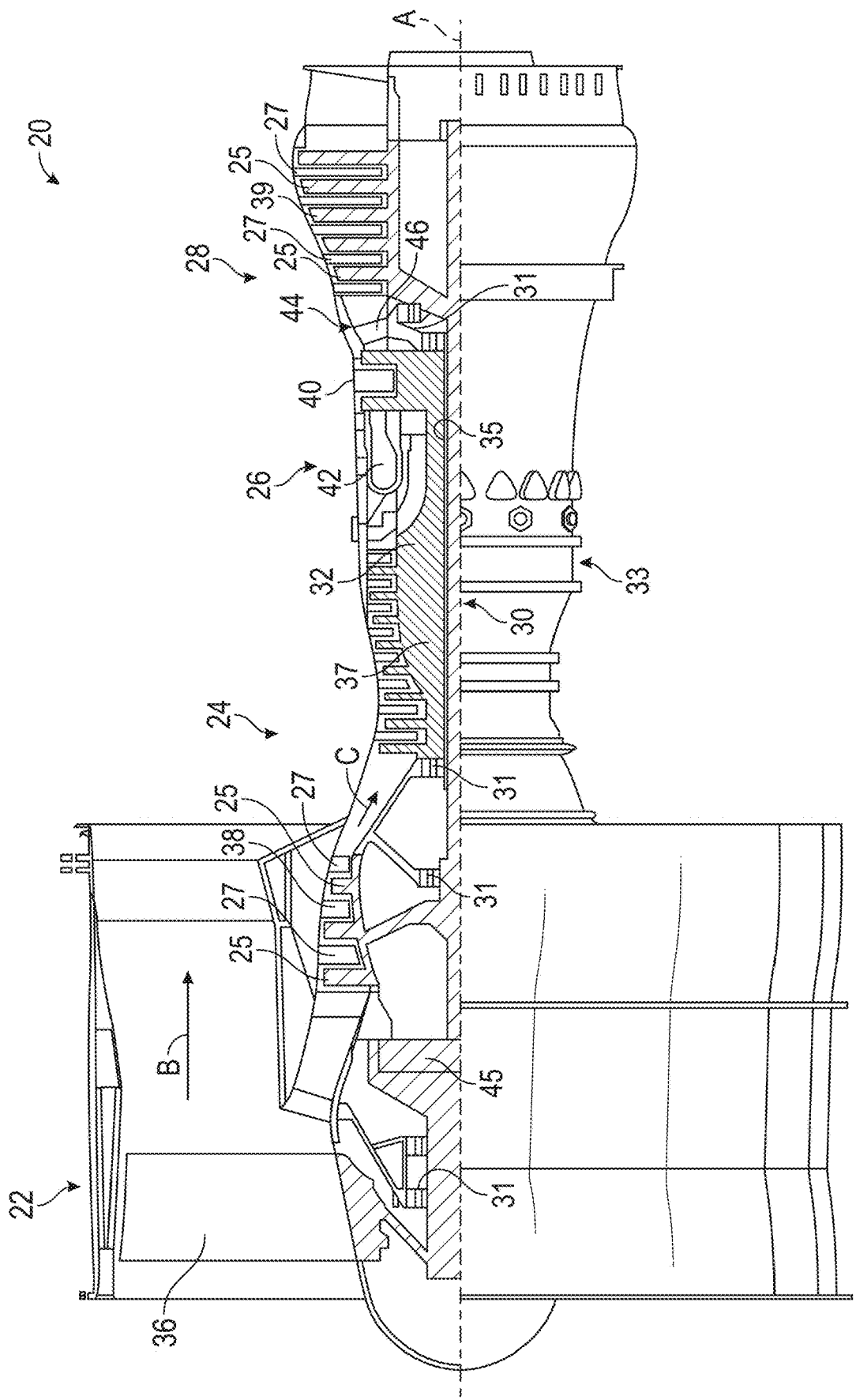
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ ^\circ R)/(518.7^\circ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
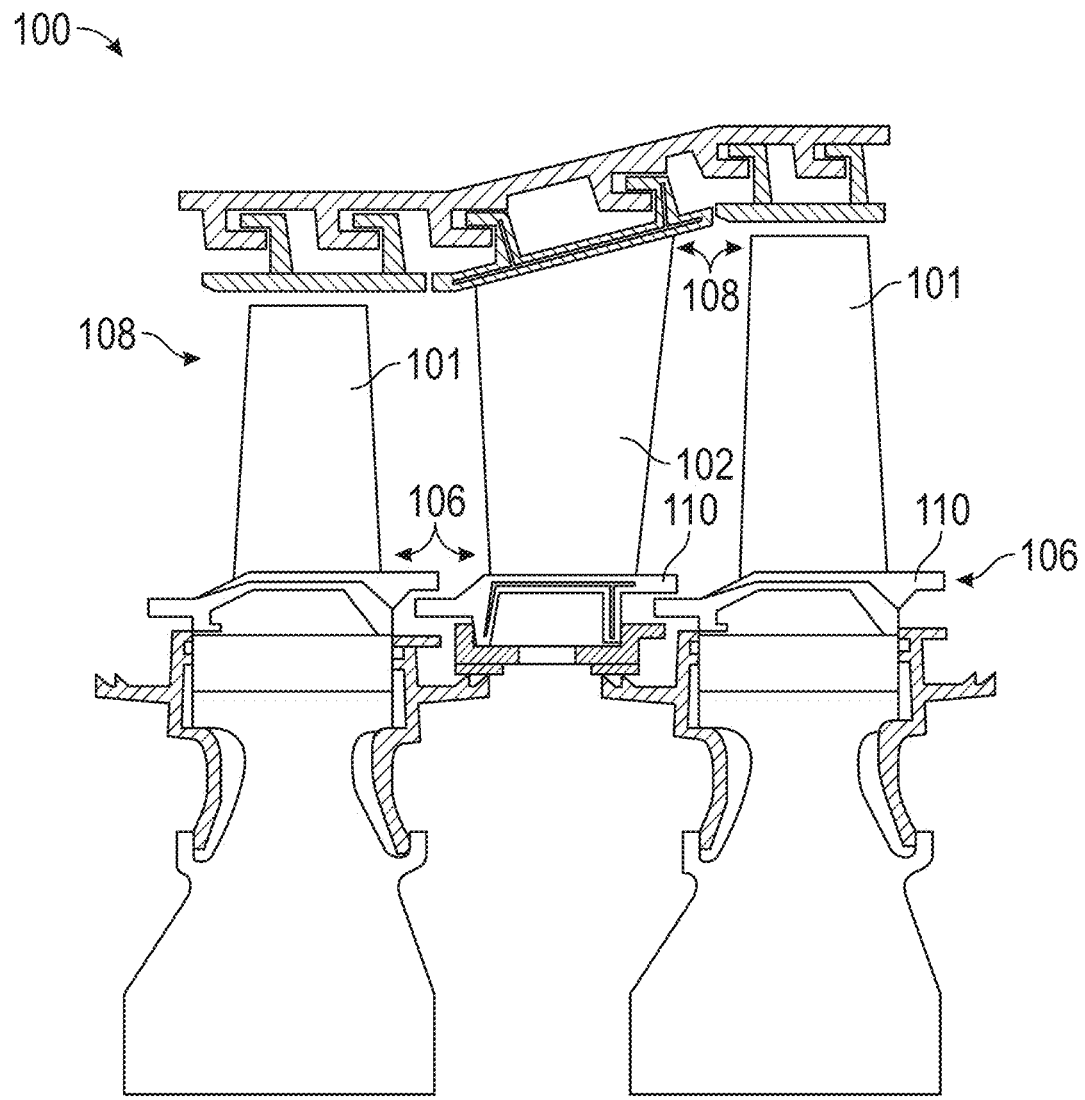
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes 102 may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110.

Although an aero or aircraft engine application is shown and described above, those of skill in the art will appreciate that airfoil configurations as described herein may be applied to industrial applications and/or industrial gas turbine engines, land based or otherwise.

Figure 2A:
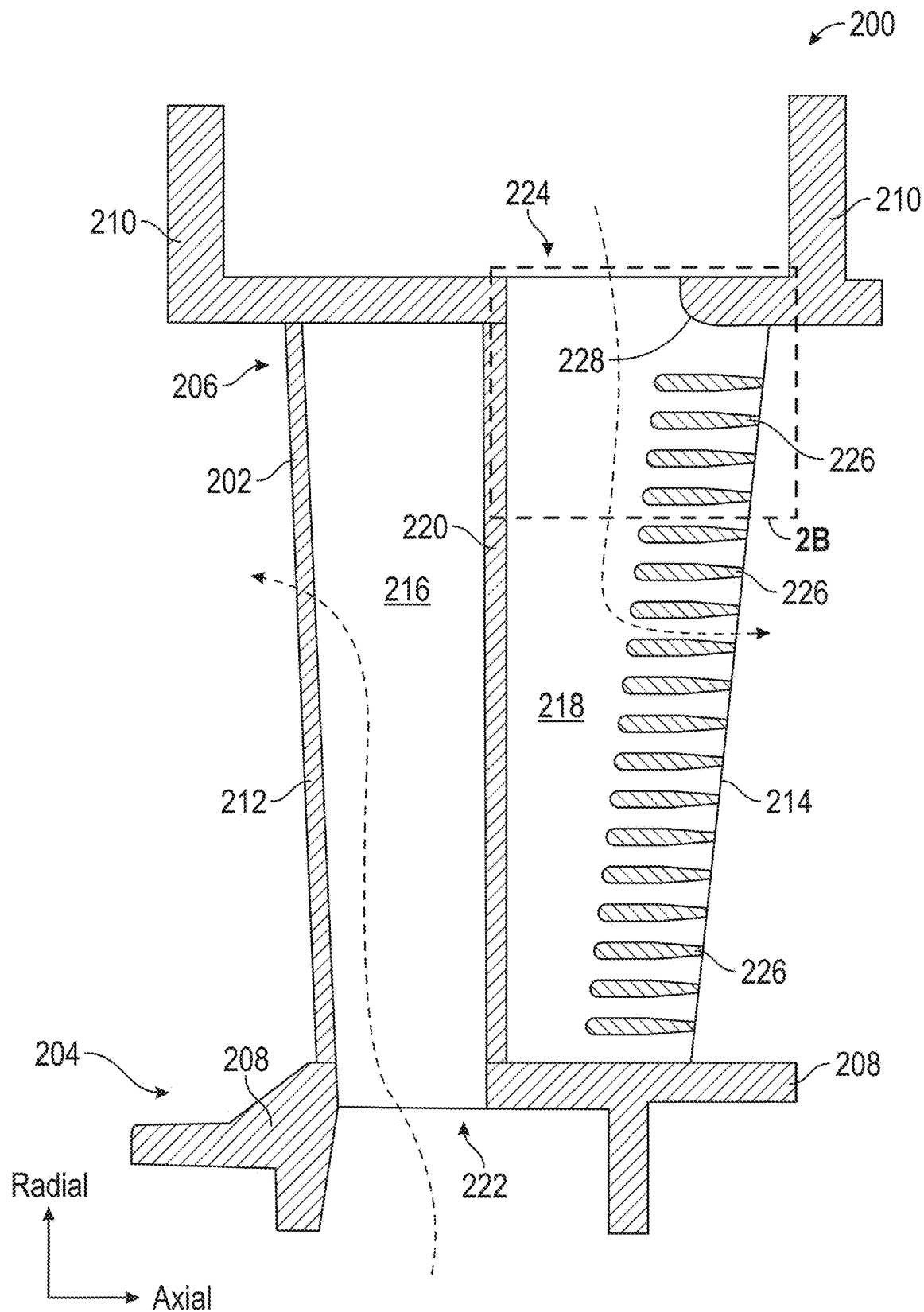
FIG. 2A is a schematic illustration of an airfoil in accordance with an embodiment of the present disclosure.
Figure 2B:
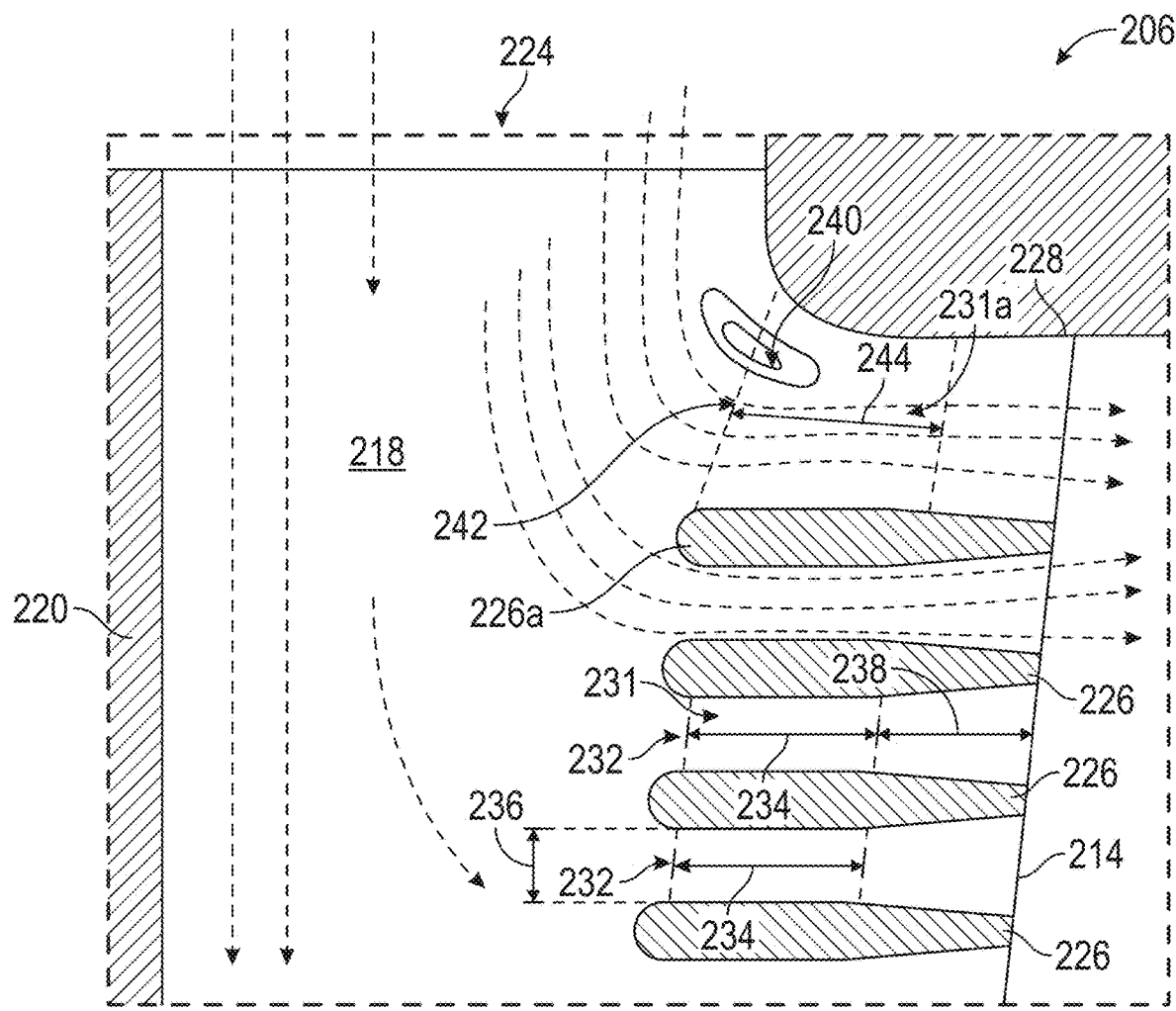
FIG. 2B is an enlarged schematic illustration of a portion of a trailing edge of the airfoil as indicated in dashed-box B shown in FIG. 2A.

Turning now to FIGS. 2A and 2B, views of an airfoil interior structure in accordance with a non-limiting embodiment of the present disclosure are shown. FIG. 2A is a cross-sectional schematic illustration of airflow passages within an airfoil 200, such as a vane or blade. FIG. 2B is an enlarged schematic illustration of a portion of a trailing edge of the airfoil 200 as indicated in dashed-box B shown in FIG. 2A. Those of skill in the art will appreciate that airflow passages as described herein may be applied to any type of airfoil or other component, such as blades, vanes, blade outer air seals, etc.

As shown, the airfoil 200 has an airfoil body 202 extending radially from a first portion 204 (e.g., an inner diameter or root region) to a second portion 206 (e.g., an outer diameter or tip region). An inner platform 208 is shown at the inner diameter (e.g., first portion 204), with the airfoil body 202 extending radially therefrom, and an outer platform 210 is located at the outer diameter (e.g., second portion 206) of the airfoil body 202. As shown, the airfoil body 202 define one or more cavities and/or flow paths therein that are configured to enable cooling of the airfoil 200.

A first cooling cavity 216 is located proximate the leading edge 212 of the airfoil 200 and a second cooling cavity 218 is located proximate the trailing edge 214 of the airfoil 200. The first cooling cavity 216 is fluidly separated from the second cooling cavity 218 by a rib 220. In the embodiment of FIG. 2A, the rib 220 extends from the inner platform 208 to the outer platform 210. However, in other embodiments, the rib 220 may only extend part way between the first portion 204 and the second portion 206 of the airfoil 200, and thus the internal cavities thereof may be fluidly connected. Further, in some embodiments addition ribs may be provided to enable different cooling schemes within the interior of the airfoil 200, such as forming a serpentine flow path within the airfoil 200. As shown, the first cooling cavity 216 is configured as a radially extending cavity within the airfoil 200 from the first portion 204 to the second portion 206 and the second cooling cavity 218 is configured as a radially extending cavity within the airfoil 200 from the second portion 206 to the first portion 204.

Cooling air enters the first cooling cavity 216 through a first feed supply 222 that is formed in the first platform 208. The air will then flow from the first portion 204 toward the second portion 206 of the airfoil body 202. As the air flows through the first cooling cavity 216, a portion of the air may be expunged or bled through one or more apertures within the surfaces of the airfoil body 202 and thus be ejected into a gaspath. Cooling air enters the second cooling cavity 218 through a second feed supply 224 that is formed in the second platform 210. The air will then flow from the second portion 206 toward the first portion 204 of the airfoil body 202. As the air flows through the second cooling cavity 218, a portion of the air will exit through the trailing edge 214 of the airfoil body 202 and thus be ejected into the gaspath.

As shown in the example embodiment of FIG. 2A, the trailing edge 214 is configured with a plurality of pedestals 226 in the second cooling cavity 218. The pedestals 226, in various embodiments, are configured to supply a blockage to maintain feed pressure within the airfoil 200 (and particularly the second cooling cavity 218), enable a backflow margin for cooling holes within the airfoil body 202, enable heat transfer augmentation on par with a refractory metal core of much smaller section thickness, and/or enable clocking of the pedestals 226 as will be appreciated by those of skill in the art to provide even distribution of flow between stages of pedestals and out the trailing edge 214 of the airfoil 200 which may mitigate loss of stage efficiency from increase in flow as compared to a refractory metal core airfoil. Although shown with a single set/column/row of pedestals 226, those of skill in the art will appreciate that multiple sets/columns/rows of pedestals and/or other flow augmentation structures can be used within an airfoil, and thus the illustration of FIGS. 2A-2B is merely provided for illustrative and explanatory purposes and is not intended to be limiting.

Turning to FIG. 2B, a schematic illustration of a portion of a cooling airflow as it passes through the second cooling cavity 218 at the second portion 206 of the airfoil 200. As noted, cooling air enters through the second feed supply 224 and will flow into and through the second cooling cavity 218. A portion of the cooling airflow will turn immediately upon entering the second cooling cavity 218 and exit proximate a curved end wall 228 of the airfoil 200. The curved end wall 228 is a portion of the airfoil body 202 that is proximate, adjacent, and/or contacting the second platform 210, as shown in FIG. 2A.

As shown in FIG. 2B, typical spacing between adjacent pedestals 226 provides for trailing edge slots 231 having uniform spacing at an inlet 232 and a meter section 234 defining parallel walls or sides of the trailing edge slots 231, as shown. The pedestals 226 are arranged to form, in part, a uniform meter section 234 of the trailing edge slots 231 that is defined by parallel sides along a portion of the length of adjacent pedestals 226. That is, the trailing edge slots 231 have uniform widths 236 in meter sections 234 defined by adjacent pedestals 226. Each of the trailing edge slots 231 further includes tapering diffuser sections 238 formed aft of the meter sections 234. The tapering diffuser section 238 taper outward from the meter section 234 to the trailing edge 214, thus having the trailing edge slots 231 widen toward the trailing edge 214. The uniform width 236 of the meter sections 234 of the trailing edge slots 231 may have a length (i.e., axial length) greater than one and a half times the hydraulic diameter, allowing flow to become fully developed, resulting in well-defined flow levels and behavior.

However, as illustratively shown in FIG. 2B, an end slot 231a is defined between an end pedestal 226a and the curved end wall 228 which may not have the well-defined flow levels that exist in the other trailing edge slots 231. That is, flow near the end pedestal 226a may separate from the curved end wall 228 and cause turbulence 240 (e.g., recirculation bubbles) as the cooling airflow tries to enter an inlet 242 of the end slot 231a located between the end pedestal 226a and the curved end wall 228. The turbulence 240 is generated because the inlet 242 of the end slot 231a between the end pedestal 226a and the curved end wall 228 is larger in area than the typical meter section 234 and the end slot 231a tapers (non-uniform width section 244) due to the contour of the end wall 228, as shown.

The increased size of the inlet 242 is caused, in part, because the standard pedestal shape of the end pedestal 226a, particularly along the non-uniform width section 244, is not parallel to the curved shape or contour of the curved end wall 228. This results in ill-defined flow behavior that is sensitive to small perturbations in the surrounding flow field, causing flow level fluctuations and flow separations.

The shape of the end slot 231a within the second cavity 218 proximate the curved end wall 228 is curved due to the contoured shape of the curved end wall 228. As shown, a conventional trailing edge pedestal 226 (or end pedestal 226a) is teardrop-shaped and has straight sides to improve flow between adjacent pedestals 226 within the trailing edge slots 231. Incorporating a conventional straight-sided trailing edge teardrop pedestal 226a next to the curved end wall 228 results in a zero length meter section in the end slot 231a (e.g., no section of "parallel walls" for metering flow). This zero length meter section does not allow the flow field to fully develop, resulting in ill-defined flow behavior that is sensitive to perturbations in the pressures and surrounding flow field. Because the cooling flow is not fully developed, the perturbations can result in flow separations and fluctuations in flow levels.

Although illustrated in FIGS. 2A-2B with the curved end wall 228 located at a the second portion 206 of the airfoil 200, those of skill in the art will appreciate that similar curved end walls may be implemented at the first portion 204 or elsewhere within the airfoil. Thus, the illustrations of FIGS. 2A-2B are merely provided for illustrative and explanatory purposes and are not intended to be limiting.

Embodiments of the present disclosure are designed to replace the traditional teardrop end pedestal next to the end wall with an end wall contoured pedestal. The end wall contoured pedestal is positioned between a traditional pedestal along the trailing edge and the curved end wall of the trailing edge slot. The end wall contoured pedestal has differing shapes of sidewalls based on adjacent surfaces/structures (e.g., pedestal or end wall). For example, in some non-limiting embodiments, a sidewall of the end wall contoured pedestal facing a traditional pedestal is unchanged in shape and has a straight/parallel sidewall such that the sides of the slot between the end wall contoured pedestal and the traditional pedestal are parallel for a distance to form a meter section of the trailing edge slot. However, the sidewall of the end wall contoured pedestal that is facing the curved end wall is curved or contoured to match the end wall shape and thus maintain a meter section within the end slot between the end wall contoured pedestal and the end wall of the cavity.

Figure 3A:
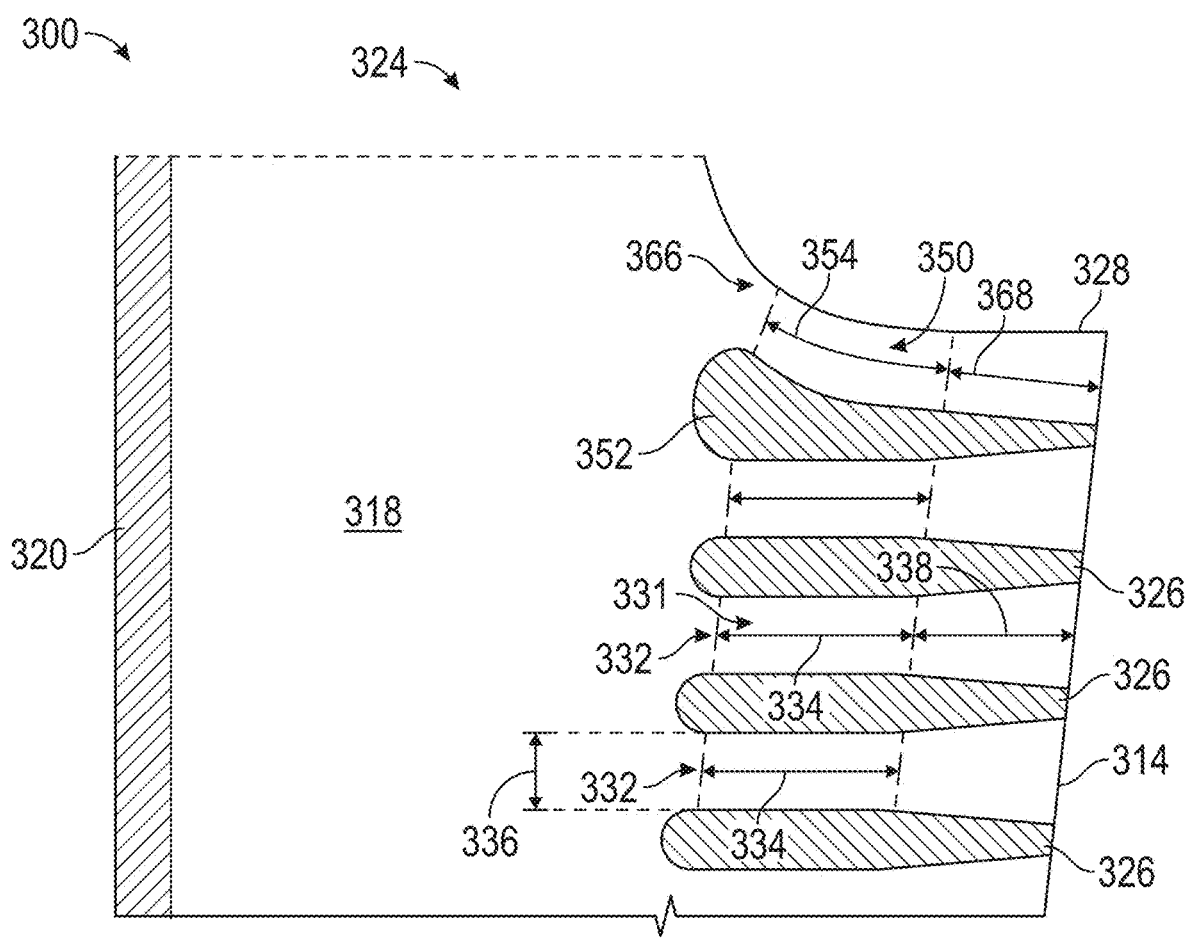
FIG. 3A is a schematic illustration of a portion of an airfoil in accordance with an embodiment of the present disclosure.
Figure 3B:
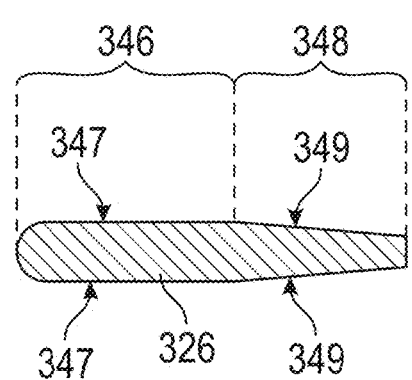
FIG. 3B is an illustration of a pedestal of the airfoil of FIG. 3A.
Figure 3C:
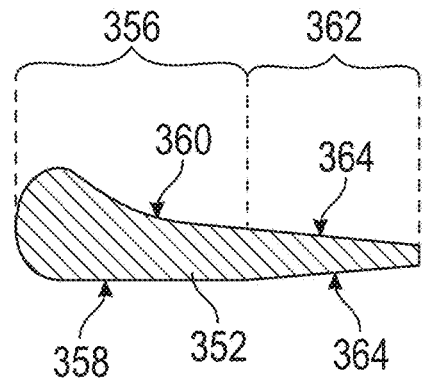
FIG. 3C is an illustration of an end wall contoured pedestal of the airfoil of FIG. 3A.

Turning now to FIGS. 3A-3C, a schematic illustrations of a portion of an airfoil 300 in accordance with an embodiment of the present disclosure is shown. FIG. 3A is an illustration of a portion of a cooling cavity 318 of the airfoil 300. FIG. 3B is a schematic illustration of a trailing edge pedestal 326 of the airfoil 300, and FIG. 3C is a schematic illustration of an end wall contoured pedestal. Cooling air enters into a cooling cavity 318 through a feed supply 324 and flows into and through the cooling cavity 318 to cool a portion of the airfoil 300. As shown, the cooling cavity 318 is proximate a trailing edge 314 and is bound on a forward side by a rib 320. As shown, the airfoil 300 includes a curved end wall 328. The curved end wall 328 is a portion of the airfoil body that is proximate, adjacent, and/or contacting a platform, for example, as shown and described above. The airfoil 300 includes a plurality of trailing edge pedestals 326 along the trailing edge 314

The plurality of trailing edge pedestals 326 define a plurality of trailing edge slots 331, with a trailing edge slot 331 defined between two adjacent trailing edge pedestals 326. Each of the trailing edge pedestals 326 includes a first portion 346 and a second portion 348, as shown in FIG. 3B. The first portion 346 is defined by parallel side walls 347. Adjacent first portions 346 of the trailing edge pedestals 326 of two proximate trailing edge pedestals 326 define a metering portion 334 of the trailing edge slots 331, as shown in FIG. 3A. Aft of the first portion 346 the side walls of the trailing edge pedestals 326 taper in the form of tapering side walls 349 and define the second portion 348, which enables definition of diffuser sections 338 at the trailing edge 314 between adjacent trailing edge pedestals 326, as shown in FIG. 3A.

As shown in FIG. 3A, typical spacing between adjacent trailing edge pedestals 326 provides for the trailing edge slots 331 having uniform spacing at an inlet 332 and a meter section 334 extending along the first portions 346 of the trailing edge pedestals 326. The trailing edge pedestals 326 are arranged to have a uniform meter section 334 that is defined by the parallel side walls 347 (see, FIG. 3B) along the length of the trailing edge pedestals 326 at the first portion 346. Accordingly, the trailing edge slots 331 have uniform widths 336 along the meter sections 334. The diffuser section 338 of the trailing edge slots 331 is formed aft of the meter section 334 by the tapering side walls 349 at the second portion of the trailing edge pedestals 326. As shown, the trailing edge slots 331 widen toward the trailing edge 314 due to the diverging tapering side walls 349 of adjacent trailing edge pedestals. The uniform width 336 of the meter sections 334 of the trailing edge slots 331 may have a length (i.e., axial length) greater than one and a half times the hydraulic diameter, allowing flow to become fully developed, resulting in well-defined flow levels and behavior.

As shown in FIG. 3A, an end slot 350 is defined between an end wall contoured pedestal 352 and the curved end wall 328. In this embodiment, the end slot 350 has substantially parallel side walls to achieve a meter section 354, with one side wall being a portion of the curved end wall 328 and the other side wall being a portion of the end wall contoured pedestal 352. To form the meter section 354, the end wall contoured pedestal 352 includes a first portion 356 having a parallel side wall 358 on one side and a contoured side wall 360 on another side. Aft of the first portion 356 is a second portion 362 that has tapering side walls 364 similar to the tapering side walls 349 of the trailing edge pedestals 326. The contoured side wall 360 is shaped to match a contour or shape of the curved end wall 328 such that the surfaces of the contoured side wall 360 and the curved end wall 328 are substantially parallel and a uniform flow passage (end slot 350) is defined therebetween.

Depending on the shape, geometry, and/or contour of the end wall, the end wall contoured pedestals of the present disclosure can include concave and/or convex contours or shapes. That is, the end wall contoured pedestals of the present disclosure have an arcuate shape, geometry, or contour that mirrors or parallels an arcuate shape, geometry, or contour of an end wall. As such, the meter section between the end wall contoured pedestal and the end wall itself is substantially uniform with the walls of the meter section being substantially parallel to each other, regardless of the shape, geometry, or contour of the end wall.

As shown, an inlet 366 to the end slot 350 is substantially the same width as the end of the meter section 354, where an end diffuser section 368 is defined between a tapering side wall 364 of the end wall contoured pedestal 352 and a portion of the curved end wall 328. Accordingly, the meter section 354 of the end slot 350 can be used to enable improved cooling flow along the curved end wall 328. As will be appreciated by those of skill in the art, the end wall contoured pedestal 352 creates a meter section 354 that is greater than one and a half hydraulic diameters. The increased hydraulic diameter of the meter section 354 enables a cooling flow to fully develop and become stable so that small perturbations in the pressure and surrounding flow field do not cause flow separations and fluctuations in flow levels along the curved end wall 328. Moreover, by having the side wall of the end wall contoured pedestal 352 follow the curved end wall 328, the end wall contoured pedestal 352 can guide the cooling flow smoothly into the end slot 350 and out of the trailing edge 314 of the airfoil 300.

Figure 4A:
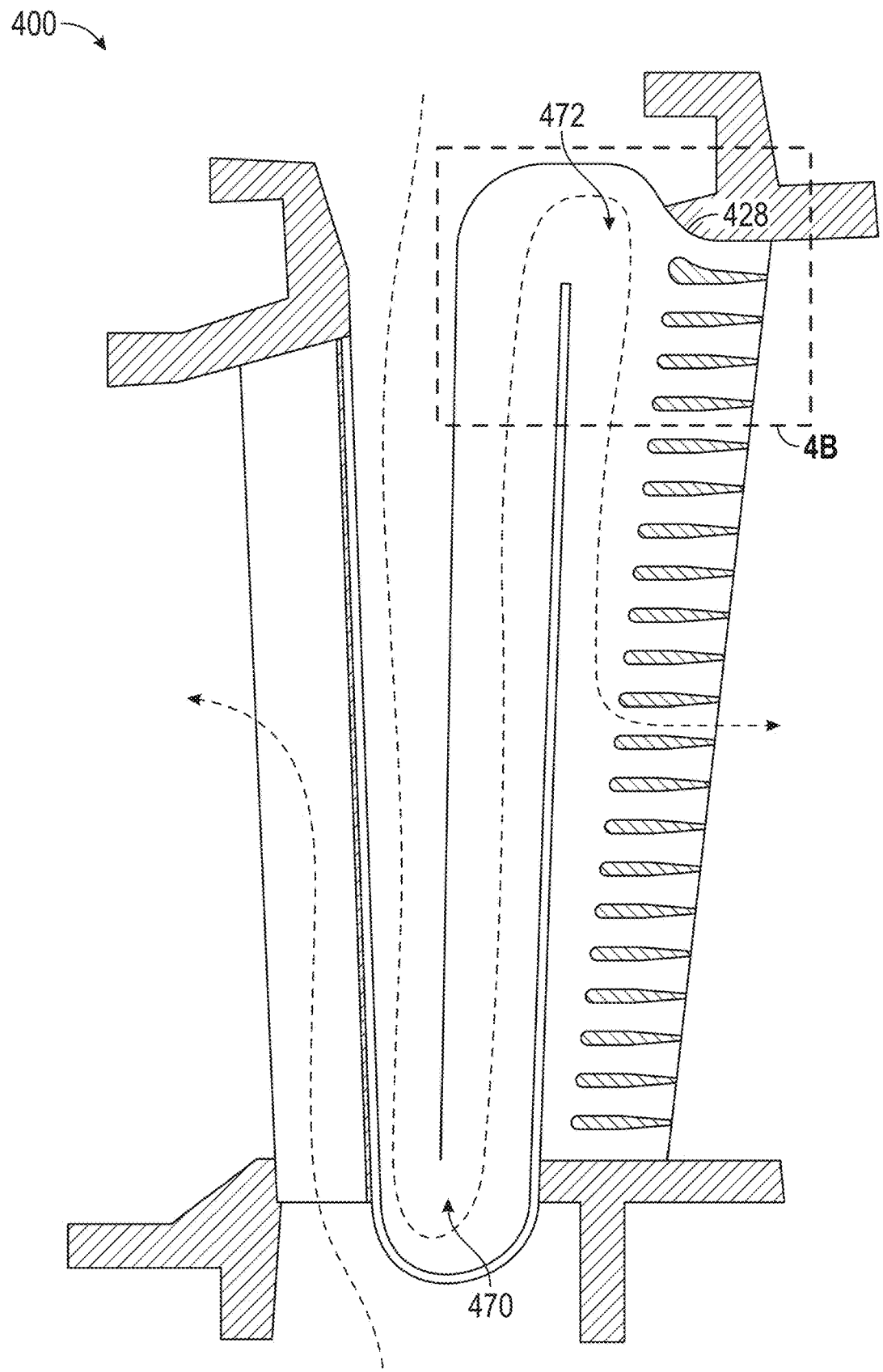
FIG. 4A is a schematic illustration of an airfoil in accordance with an embodiment of the present disclosure.
Figure 4B:
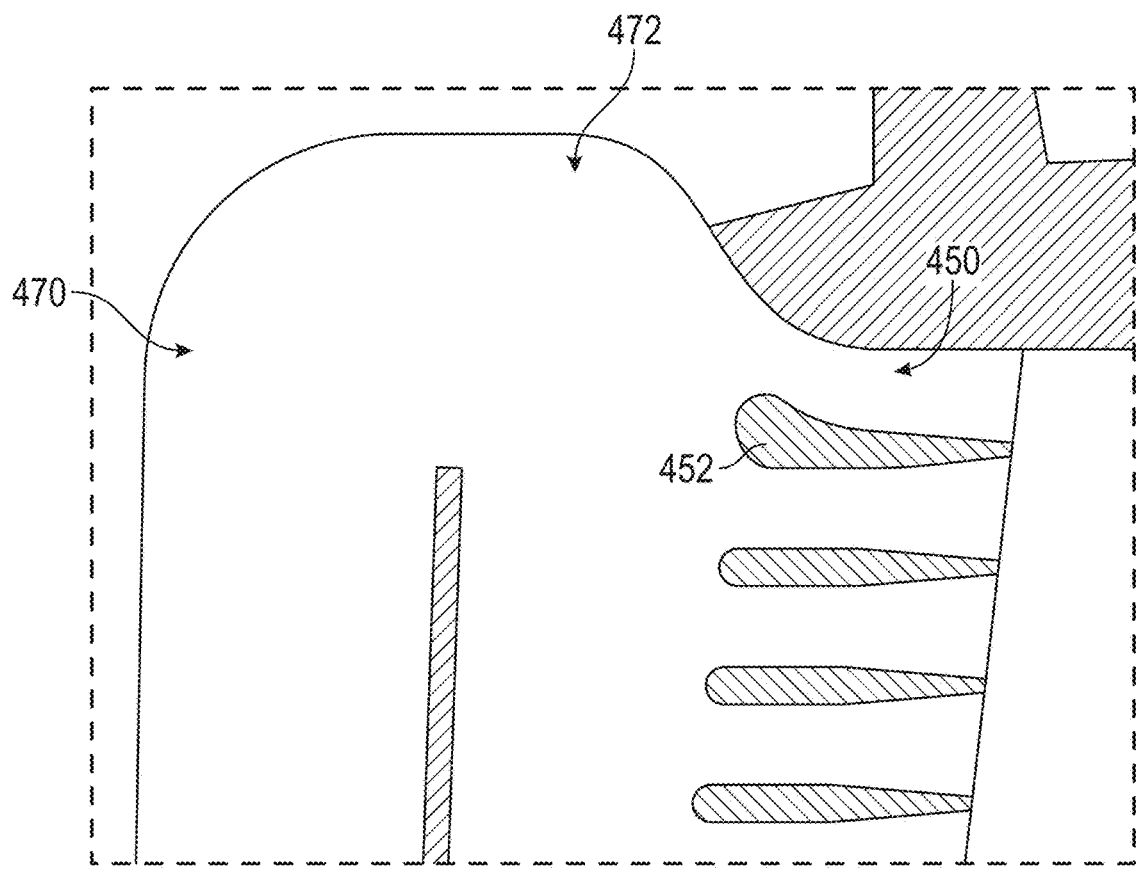
FIG. 4B is an enlarged schematic illustration of a portion of a trailing edge of the airfoil as indicated in dashed-box B shown in FIG. 4A.

Turning now to FIGS. 4A and 4B, views of an airfoil 400 in accordance with a non-limiting embodiment of the present disclosure are shown. FIG. 4A is a cross-sectional schematic illustration of airflow passages within the airfoil 400. FIG. 4B is an enlarged schematic illustration of a portion of a trailing edge of the airfoil 400 as indicated in dashed-box B shown in FIG. 4A. Those of skill in the art will appreciate that airflow passages as described herein may be applied to any type of airfoil or other component, such as blades, vanes, blade outer air seals, etc. The airfoil 400 is similar to that described above, and thus similar features will not be described above.

The airfoil 400 has an internal structure defining a serpentine cavity 470. As shown, the final turn in the serpentine cavity 470 turns into a trailing edge cavity 472. The airfoil 400 includes a curved end wall 428 that is similar to that described above. As such, similar fluid characteristics may arise if only traditional trailing edge pedestals are used. Accordingly, as shown in FIG. 4B, an end slot 450 is defined between an end wall contoured pedestal 452 and the curved end wall 428. In this embodiment, the end slot 450 has substantially parallel side walls to achieve a meter section, with one side wall being a portion of the curved end wall 428 and the other side wall being a portion of the end wall contoured pedestal 452, as described above. The end wall contoured pedestal 452 is substantially similar to that shown and described above.

Figure 5:
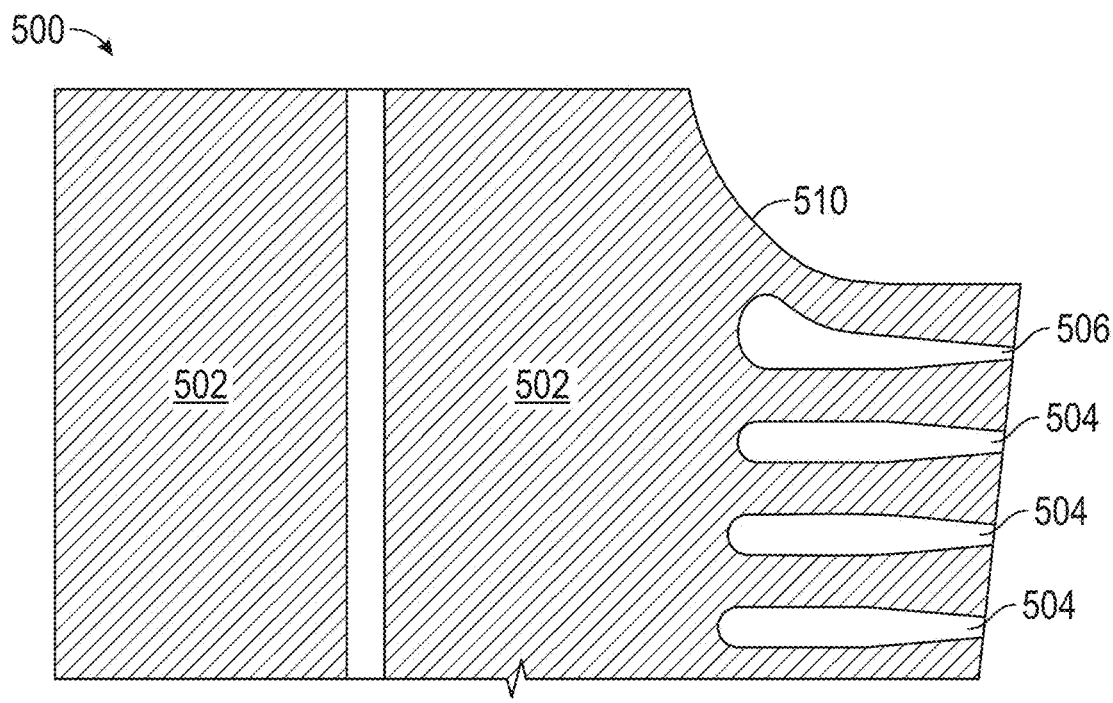
FIG. 5 is a schematic illustration of a core for manufacturing an airfoil in accordance with an embodiment of the present disclosure.

Turning now to FIG. 5, a partial view of a core 500 for manufacturing an airfoil of a gas turbine engine in accordance with the present disclosure is shown. The core 500 includes a core body 502 having a plurality of voids 504, 506 formed therein. The voids 504, 506 are configured to enable manufacture of an airfoil having an internal cavities with a plurality of pedestals formed therein. The core body 502 has a leading edge 508 and a trailing edge 508 extending in a radial direction, similar to that described above. The core body 502 includes structures to define one or more cooling cavities to be formed in an airfoil, as will be appreciated by those of skill in the art. As illustrated in FIG. 5, the core body 502 includes a wall structure 510 for defining an internal wall of a cooling cavity in the formed airfoil. As shown, the wall structure is curved and defines an end wall of the cavity in the formed airfoil.

The voids 504, 506 are arranged to define a plurality of pedestals in the formed airfoil body. First voids 504 are arranged within to define trailing edge pedestals, which each trailing edge pedestal including a first portion and a second portion similar to that described above with respect to the trailing edge pedestals of the above described embodiments. For example, the first voids 504 include a first portion having parallel side walls and a second having tapering side walls. Further, a second void 506 is arranged proximate the wall structure 510 and defines a core cavity void to form an end wall contoured pedestal as shown and described above. The second void 506 is positioned adjacent the wall structure 510 which defines a curved end wall. The second void 506 is an end wall contoured pedestal void that has a first portion with a contoured side wall and a parallel side wall and a second portion with tapering side walls. The contoured side wall of the second void 506 faces the curved end wall structure 510. Further, the contoured side wall of the second void 506 parallels a contour, shape, or geometry of the curved end wall structure 510. The core body 502, as shown herein, enables formation of an airfoil having a meter section at a location where the formed airfoil includes a curved airfoil, as shown and described above.

Although shown and described herein with respect to end wall contoured pedestals positioned at an outer diameter or second portion of an airfoil, those of skill in the art will appreciate that the end wall contoured pedestals may be located at any desirable position within an airfoil body. Further, although shown with the end wall contoured pedestals located proximate a trailing edge, those of skill in the art will appreciate that the end wall contoured pedestals may be located at any axial position within an airfoil, including proximate a leading edge, located within tip flag cavities, within serpentine cavities, etc. Thus, the illustrative embodiments provided herein are not to be limiting.

Further, although shown and described with respect to an airfoil, some embodiments disclosed herein are directed to core configurations for manufacturing such airfoils. For example, some embodiments are directed to cores for manufacturing airfoils of gas turbine engines as shown and described above. The cores include a core body (rather than an airfoil body) having a plurality of apertures and voids therein to form ribs, walls, and pedestals (the positive structure of the airfoils). For example, in the above described descriptions of the illustrations, rather than positive structures of pedestals and cavities, the opposite arrangement is present in cores of the present disclosure. Such positive-negative relationship is readily apparent to those of skill in the art and thus repeated illustrations of the cores (e.g., "negatives") are not shown herein for simplicity.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An airfoil of a gas turbine engine comprising:
an airfoil body having a leading edge and a trailing edge extending in a radial direction;
a cooling cavity defined within the airfoil body, wherein at least one wall of the cooling cavity is a curved end wall;
an end wall contoured pedestal positioned adjacent the curved end wall and arranged along the trailing edge, wherein the end wall contoured pedestal has a first portion with a contoured side wall and a parallel side wall, and a second portion with tapering side walls, wherein the contoured side wall faces the curved end wall, the contoured side wall of the first portion of the end wall contoured pedestal paralleling a contour of the curved end wall of the airfoil body and defining a meter section therebetween, and wherein the tapering side walls of the second portion define a diffuser section arranged downstream of the first portion, wherein the contoured side wall and a first side of the tapering side wall form an arcuate shape on a first side of the end wall contoured pedestal and the parallel side wall and a second side of the tapering side wall form a non-arcuate shape on a second side of the end wall contoured pedestal; and
a plurality of additional pedestals arranged within the cooling cavity along the trailing edge, wherein each pedestal of the plurality of additional pedestals includes a first portion and a second portion, the first portion having parallel side walls and the second portion having tapering side walls,
wherein a geometry of each pedestal of the plurality of additional pedestals is the same and the end wall contoured pedestal has a different geometry than the geometry of the pedestals of the plurality of additional pedestals.

2. The airfoil of claim 1, wherein an end slot is defined between the contoured side wall and a portion of the curved end wall.

3. The airfoil of claim 1, wherein the airfoil body has an inner diameter and an outer diameter and the curved end wall is located at at least one of the outer diameter and the inner diameter.

4. The airfoil of claim 1, wherein the cooling cavity is a serpentine cavity within the airfoil body.

5. The airfoil of claim 1, wherein the first portion of the end wall contoured pedestal has a length longer than one and a half times a hydraulic diameter of the meter section.

6. The airfoil of claim 1, wherein the contoured side wall is shaped to match a contour of the curved end wall such that the surfaces of the contoured side wall and the curved end wall are substantially parallel and a uniform flow passage is defined therebetween.

7. A gas turbine engine comprising:
an airfoil having:
an airfoil body having a leading edge and a trailing edge extending in a radial direction;
a cooling cavity defined within the airfoil body, wherein at least one wall of the cooling cavity is a curved end wall; and
an end wall contoured pedestal positioned adjacent the curved end wall and arranged along the trailing edge, wherein the end wall contoured pedestal has a first portion with a contoured side wall and a parallel side wall, and a second portion with tapering side walls, wherein the contoured side wall faces the curved end wall, the contoured side wall of the first portion of the end wall contoured pedestal paralleling a contour of the curved end wall of the airfoil body and defining a meter section therebetween, and wherein the tapering side walls of the second portion define a diffuser section arranged downstream of the first portion, wherein the contoured side wall and a first side of the tapering side wall form an arcuate shape on a first side of the end wall contoured pedestal and the parallel side wall and a second side of the tapering side wall form a non-arcuate shape on a second side of the end wall contoured pedestal; and a plurality of additional pedestals arranged within the cooling cavity along the trailing edge, wherein each pedestal of the plurality of additional pedestals includes a first portion and a second portion, the first portion having parallel side walls and the second portion having tapering side walls, wherein a geometry of each pedestal of the plurality of additional pedestals is the same and the end wall contoured pedestal has a different geometry than the geometry of the pedestals of the plurality of additional pedestals.

8. The gas turbine engine of claim 7, wherein the airfoil body has an inner diameter and an outer diameter and the curved end wall is located at at least one of the outer diameter and the inner diameter.

9. The gas turbine engine of claim 7, wherein the cooling cavity is a serpentine cavity within the airfoil body.

10. The gas turbine engine of claim 7, wherein the first portion of the end wall contoured pedestal has a length longer than one and a half times a hydraulic diameter of the meter section.

11. The gas turbine engine of claim 7, wherein the contoured side wall is shaped to match a contour of the curved end wall such that the surfaces of the contoured side wall and the curved end wall are substantially parallel and a uniform flow passage is defined therebetween.

12. The gas turbine engine of claim 7, wherein an end slot is defined between the contoured side wall and a portion of the curved end wall.

* * * * *